United States Patent [19]

Piso

[11] 3,879,660

[45] Apr. 22, 1975

[54] CAPACITIVE MEASURING SYSTEM

[76] Inventor: John S. Piso, 987 Edgell Rd., Framingham, Mass. 01701

[22] Filed: Oct. 24, 1973

[21] Appl. No.: 409,092

[52] U.S. Cl. ............... 324/61 R; 28/64; 324/DIG. 1
[51] Int. Cl. ............................................ G01r 27/26
[58] Field of Search ......... 324/61 R, 61 P, DIG. 1; 28/64; 73/160

[56] References Cited
UNITED STATES PATENTS

| | | | |
|---|---|---|---|
| 3,742,347 | 6/1973 | Walton | 324/61 R |
| 3,757,211 | 9/1973 | Goto | 324/61 R |

Primary Examiner—Stanley T. Krawczewicz
Attorney, Agent, or Firm—Kenway & Jenney

[57] ABSTRACT

A system for continuously measuring and monitoring physical or chemical changes in materials by detecting capacitive changes as the materials pass a sensor. In a specific application, threads, filaments, wires or tapes are passed at high speed through a sensor to provide continuous direct measure of capacitance.

In the particular case of monitoring denier of synthetic yarns, the sensor is mounted directly upon a spin station superstructure and the newly formed fiber is drawn through the plates of capacitors in the sensor head. The capacitors in the sensor head are arranged in a bridge and the bridge unbalance output is differentially amplified and fed to a synchronously operated phase-sensitive detector, the direct current output of which may be amplified, compared with standards and utilized as a continuous display or feed-backs for alarm indicators, for quality control, or for process control.

12 Claims, 8 Drawing Figures

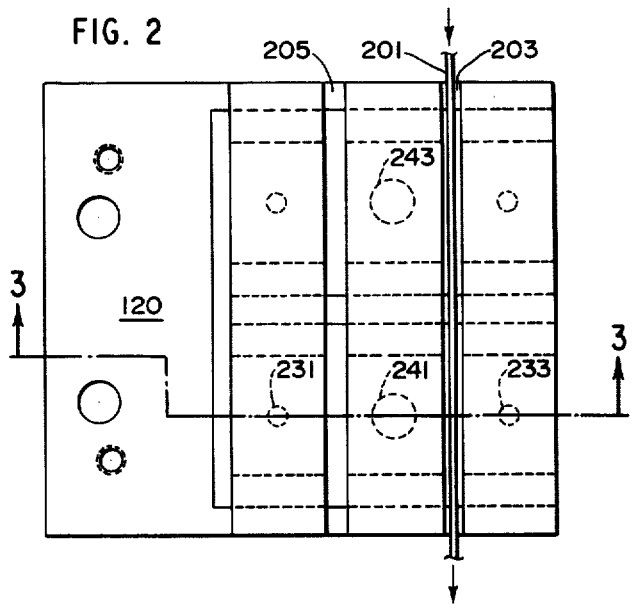
FIG. 2
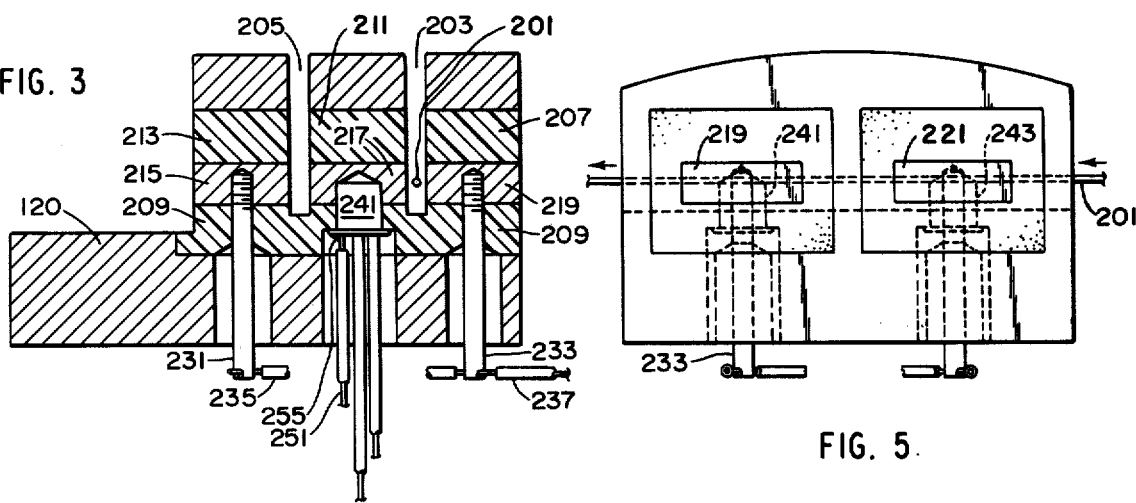
FIG. 3
FIG. 5
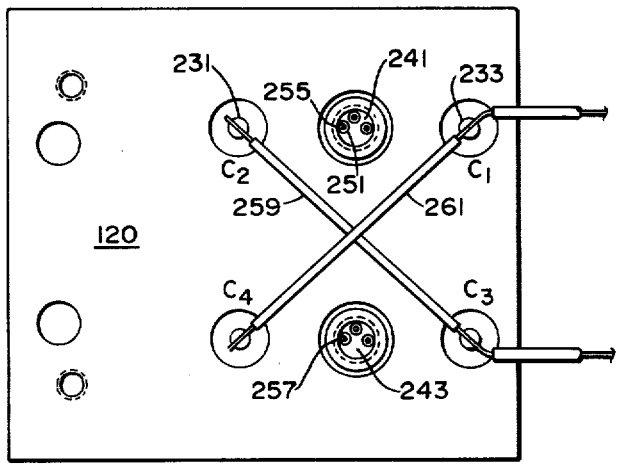
FIG. 4

CAPACITIVE MEASURING SYSTEM

BACKGROUND OF THE INVENTION

The system of the present invention is one of general applicability to monitoring of yarn denier, wire gauge, tape irregularity, moisture content and other characteristics capable of determination capacitively. For ease of understanding, however, reference is made primarily to yarn denier monitors and measurements systems.

Most commonly, air gauging methods are used to indicate whenever fiber diameter deviates from some selected value. Such equipment generally includes a tube which fits snugly around the fiber being gauged and air at an accurately stabilized pressure is passed through the tube. Changes in fiber diameter vary the volume of the tube and air pressure monitors detect the resulting change of air flow at the outlet end of the gauging tube. No absolute measurements are generally made, but a signal is provided when the diameter of the fiber deviates from some selected value. The major disadvantage of such systems is their lack of sensitivity, variations of less than plus or minus 5 percent of the selected value being incapable of detection.

Some work has been done on capacitive measuring systems, but they have been limited to the measurement of changes rather than providing absolute measurements. Moreover, they are generally unstable and prone to drift. Finally, their sensitivity and capability of distinguishing signals from noise have been of a low degree, and they have been expensive both in original cost and in maintenance.

SUMMARY OF THE INVENTION

The present invention avoids the problem of prior art systems by first incorporating in a capacitive bridge integral preamplification at high input impedance and by synchronously demodulating the amplified signals in a manner which clearly distinguishes those signals from the noise level.

Field-effect transistors are literally integrated electrically in capacitor plates in a sensor head and their outputs are differentially amplified and demodulated in phase-sensitive detectors which are synchronously related to the source of energization of the capacitive bridge.

The configuration of the sensor head in which the bridge is formed is such that inherent stability exists. Material being monitored passes through capacitors so disposed as to balance out changes which occur as temperature or other parameters change. The configuration is also such that sensitivity is doubled as compared to known capacitive devices. An output which is an absolute measure of denier is continuously provided and thus may be compared with a standard or reference denier as the yarn is being made. Alarms or control mechanisms to correct the process may also be actuated.

For a better understanding of the invention reference should be made to the following description of an embodiment preferred for monitoring denier and to the appended drawing in which:

FIG. 1 is a schematic showing of a spin-draw system,
FIGS. 2 through 5 illustrate details of a sensor head,
FIG. 6 is a block diagram of the sensor circuitry,
FIG. 6A is a schematic view of a variable filter, and
FIG. 7 illustrates the phase-sensitive demodulator of the system.

DESCRIPTION OF PREFERRED EMBODIMENT

Figure 1:
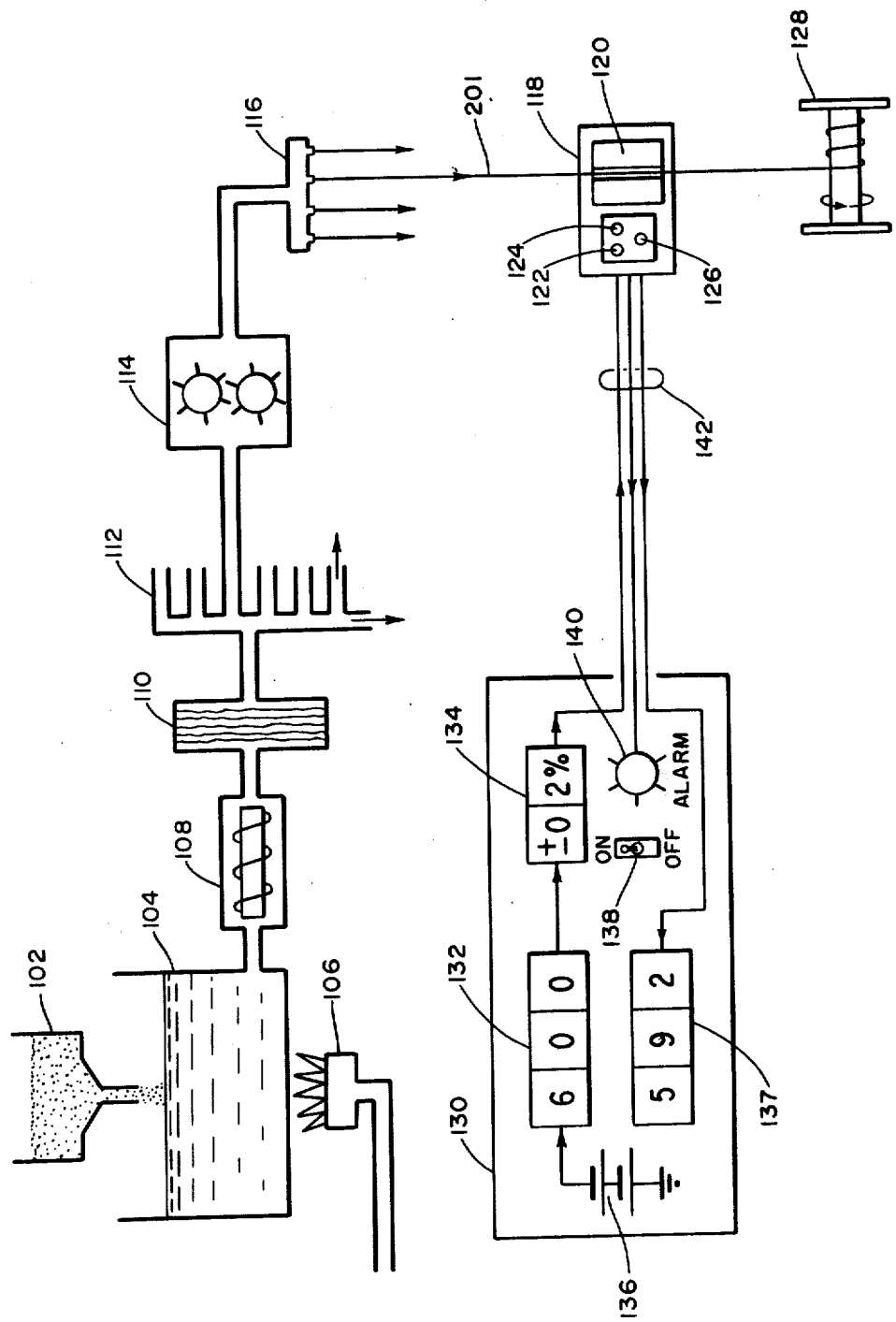

In FIG. 1, there may be seen a system which includes a container 102 in which a quantity of plastic material such as polymer chips is stored. The chips are dropped into a second container 104 which is heated by a burner 106 to form liquid plastic. The liquid polymer is then withdrawn from the container 104 by a pump 108 and passed through a filter 110. Emerging from the filter 110, the liquid plastic may be passed into a manifold 112 from each outlet of which metering pumps 114 dispense the plastic to spinnerette extruders such as that shown at 116. Commonly, the spinnerette has four outlets from which yarn emerges and each of the yarns may be passed through a sensor head 118.

The sensor head 118 is an integral part of the present invention and will be explained in greater detail hereinbelow. For present purposes, it need be noted only that the sensor head includes a capacitive gauging element 120, a high denier alarm light 122 and a low denier alarm light 124, as well as a reset button 126. The yarn, as it emerges from the capacitive gauging element 120 is wound up on a reel 128.

A central controller 130 may provide suitable signals for a number of stations and it includes digital thumb wheels for setting the desired denier and the permissible tolerance levels. As an example, a selected denier of 600 is set on the dial 132 and a tolerance of ± 2 percent is set on the tolerance dial 134. The voltage references from which these values are derived are shown schematically at 136. A running measurement of the absolute denier being sensed is displayed at 137. Finally, a power switch 138 and an alarm 140, which may be audible or visual, complete the display panel of the central controller 130.

As indicated by the arrows on the individual lines of a cable 142 running from the sensor 118 to the controller 130, absolute denier is carried on the lowest line of the three lines of the cable; comparison or reference signals are carried on the top line of the cable from the central controller to the sensor head and alarm actuation is carried from the sensor head to the controller by the central line of the cable 142.

In addition to its capability of providing out-of-tolerance alarms, the equipment can develop digital denier data for computers, recorders, quality control or feedback for process control or other equipment.

Detail on the sensor head 120 is shown in FIGS. 2-5. In FIGS. 2, 3 and 5, there may be seen a length of material 201 whose characteristics are being checked as it passes through a slot 203 in the sensor head 120. The sensor head is usually enclosed in a housing (not shown) and that housing is slotted at positions corresponding to either or both of the slots 203 and 205 which are formed in the head. The width of these slots is not critical and may be varied to some extent depending upon the size of the material being monitored. However, a width of 0.090 inch is suitable for a wide variety of applications.

The casting, as first formed, includes two central aluminum slugs which are formed integrally with the outer shell. However, after potting and machining, the slugs become independent segments isolated from each other by air gaps in the slots 203 and 205 and from the outer shell by the potting compound.

The potting compound which may be an epoxy resin, is poured into the casting and, when hardened, serves to hold the central slugs in place. Subsequently, the ends are cut and the slots 203 and 205 are cut to provide two sets of three independent slug segments. The potting compound may be seen at areas 207, 209, 211 and 213. One set of independent slug segments may best be seen at 215, 217 and 219 in FIG. 3. An identical parallel trio of slug segments is formed by the cutting and slotting operation, one of these segments 221 being visible in FIG. 5. Each individual slug segment forms an electrode or plate of a capacitor. In FIG. 3 it may be seen that the length of material 201 passes between the segments 217 and 219, those two slug segments constituting one of the capacitors of the system. In each of the outer slug segments of the head, threaded holes are formed to receive screws to which leads are attached for electrical connection. The screws 231 and 233 and their associated leads 235 and 237 are typical.

In each of the central slug segments, a somewhat larger opening is formed to receive the metallic housing of an FET transistor, the transistors 241 and 243 being visible in FIGS. 3 through 5. The transistor containers are soldered or otherwise fixed in good electrical contact to the slug segments 217 and 225 respectively. To minimize capacitance at the input to the FET transistors the gate leads, of which the lead 251 is typical, are soldered to the respective cases of the transistors with which they are associated. The electrical connection between the gate leads and the transistor cases is indicated by the soldered joints 255 and 257.

Also, as seen in FIG. 4, one input lead to the sensor head connects to the outer electrode of the capacitor $C_4$ as well as to the outer electrode of the capacitor $C_1$ through the cross-connection 261. Similarly, the other input lead is connected to the outer electrodes of the capacitors $C_2$ and $C_3$ via the cross-connection 259. Input energization of the bridge is preferably sinusoidal but may be square wave signals of opposite phase adjusted to null the bridge in the absence of material in either slot 203 or 205.

The physical and electrical juxtaposition of the capacitors in the bridge, and the open slots and ends of the head lead to cancellation of erroneous indications which might otherwise be encountered. Even greater stability is possible, especially in the face of temperature and humidity changes by heating the entire sensor head above normal ambient temperatures.

Material may be run through both slots 203 and 205 for differential measurement or monitoring, as, for example, in checking migrated filaments in two-end spinning. No changes are required in the electronics of the system to effect differential operation.

The sensor head is normally made of aluminum as are the capacitor segments, but other materials may be used. Finally, trim adjustments are possible by providing screws which may be threaded into selected capacitor segments. Each capacitor has a nominal value of 0.5 pf and the changes being measured may be of the order of 0.0005 pf.

Figure 6:
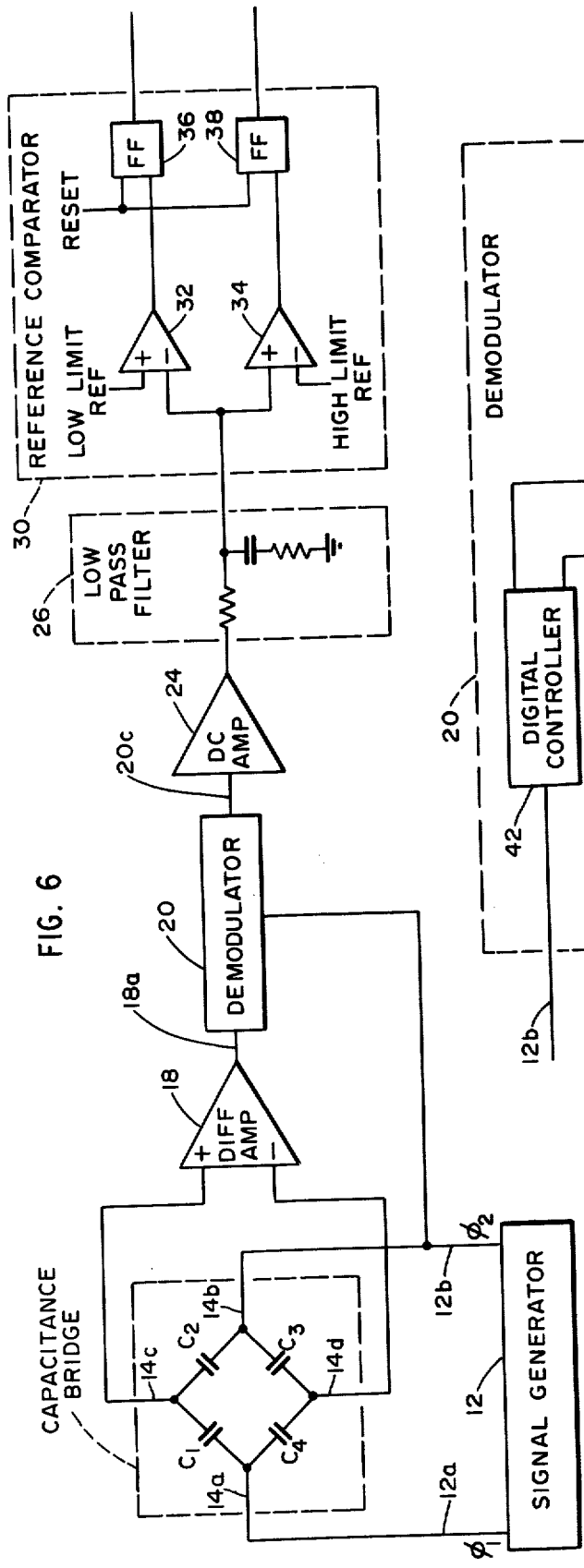

FIG. 6 shows an embodiment of the present invention in block diagram form. In that figure, a signal generator 12 is shown to have output lines 12a and 12b connected to a capacitor bridge 14 at bridge terminals 14a and 14b, respectively. The signals produced by generator 12 on lines 12a and b are sinusoidal and have the same frequency. The frequency of these signals may be, for example, 20 khz. In addition, the signal on line 12a is b 180° out of phase with the signal on line 12b.

The capacitor bridge 14 comprises a set of four capacitors connected in a bridge configuration. The output terminals 14c and 14d of the bridge 14 are connected to the input terminals of a differential amplifier 18. The output line 18a from the amplifier 18 is connected to a first input of the demodulator 20. Line 12b from signal generator 12 applies a signal to a second input of the demodulator 20. The output of demodulator 20 is applied by way of the line 20a, a d.c. amplifier 24, and a low pass filter 26 to a reference comparator 30.

The capacitance bridge 14 includes the capacitors C1, C2, C3, and C4. The capacitors C1-C4 are described above in connection with the sensor head for the embodiment of the present invention. In that description, the sensor head is shown to have four substantially identical geometrical configurations, each forming a capacitive structure with two electrodes separated by an air gap and dielectric material. The capacitance associated with each of these capacitors C1-C4 is substantially equal when the dielectric between the two electrodes of the various capacitive structures is identical.

In the operation of the invention, a length of material is passed between electrodes of two of the opposite capacitors in the bridge configuration, assumed here to be the capacitors C1 and C3. Consequently, the capacitance associated with each of those capacitors C1 and C3 is different from the capacitance associated with the capacitors C2 and C4, since the dielectric material is different. It is further assumed that the material which is positioned between the electrodes of the capacitor C1 is of substantially the same dimensions and characteristics as the material positioned between the electrodes of the capacitor C3, i.e. the capacitance associated with both C1 and C3 is substantially the same.

In the system of FIG. 6, the a.c. signals applied from generator 12 via lines 12a and 12b across the bridge at terminals 14a and 14b produce a first a.c. signal at terminal 14c having its amplitude proportional to the difference between the capacitance associated with capacitors C1 and C3 and the capacitance associated with capacitors C2 and C4, and a second a.c. signal at the terminal 14d is 180° out of phase from the signal at the terminal 14c but having identical amplitude. These two signal components from the terminals 14c and 14d are applied respectively to the plus and minus inputs of the differential amplifier 18. The amplifier 18 produces on line 18a a combined signal at the basic frequency of generator 12 and having an amplitude which is proportional to the difference in the capacitance associated with the two sets of capacitors, C1, C3 and C2, C4 (i.e. effectively modulated by the characteristics of the length of material).

The latter signal is applied from line 18a to the first input of demodulator 20. The output signal from the generator 12 on the line 12b is used to demodulate the signal from the amplifier 18 in a manner which detects the amplitude modulation on that signal. Thus, the output of the demodulator 20 is a signal proportional to the difference in capacitance associated with the capacitor pairs C1, C3 and C2, C4. This signal is amplified by the d.c. amplifier 24 and applied to the low pass filter 26.

The resultant signal from filter 26 is applied to the reference comparator 30. The reference comparator includes a pair of input terminal comparator circuits 32 and 34. The comparator terminals 32 and 34 are connected respectively to output flip-flops 36 and 38. The comparator circuits 32 and 34 are connected through a first input terminal to the filter 26 and have predetermined reference signals applied to their other input terminals. When the amplitude of the signal from the filter 26 is below the amplitude of the reference signal applied to the comparator circuit 32, the flip-flop 36 is set to its binary 1 state actuating the $LED_1$ described above. When the amplitude of the signal from the filter 26 is above the amplitude of the reference signal applied to the comparator circuit 26 the flip-flop 38 is set in its binary 1 stage, and an output signal is applied to its optical readout device $LED_2$ to indicate that state. The flip-flops 36 and 38 also include a connection for resetting each of those flip-flops to its binary 0 state by an operator.

In this configuration, when the thickness of the length of material produces a capacitance associated with capacitors C1 and C3 at bridge 14 and in turn produces a signal at the output of filter 26 which is outside the range of signals defined by the predetermined reference signals applied to circuits 34 and 38, an optical indication is provided for an operator. In addition, the optical indication advises the operator whether the signal from filter 26 is above or below the predetermined range.

Figure 7:
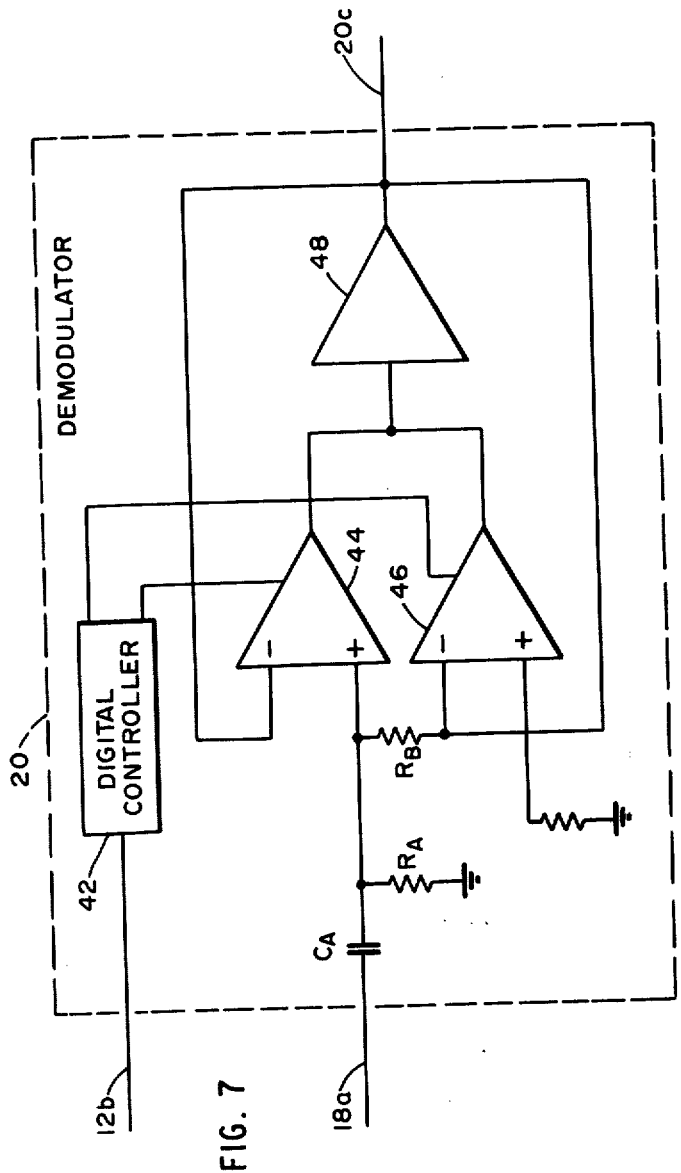

The demodulator 20 will now be described in more detail in conjunction with the embodiment shown in FIG. 7. In that figure, the output from the differential amplifier 18 is applied by way of the line 18a to the input of the demodulator 20. The signal on line 18a is a.c. coupled by way of capacitor Ca and resistor Ra to the plus input of a differential amplifier 44. The plus input of amplifier 44 is coupled by way of a resistor Rb to the minus input of a differential amplifier 46 and the output of a d.c. amplifier 48. The plus input of amplifier 46 is connected by way of a resistor Rc to ground. The minus input of amplifier 44 is connected to the output of the amplifier 48. The outputs of the amplifiers 44 and 46 are connected to the input of the amplifier 48. The output of amplifier 48 is also connected by way of the line 20a to the d.c. amplifier 24 as shown in FIG. 6.

The input line 12b from signal generator 12 of FIG. 6 is applied to a conventional digital controller 42 of the demodulator 20. The controller 42 has a first output connected to an enabling input of amplifier 44 and a second output connected to an enabling input of amplifier 46.

In operation, the controller 42 is effective to apply an enabling signal to the respective ones of the amplifiers 44 and 46 during alternate half cycle portions of the signal as applied on line 12b. As a result, the amplifier 44 is enabled during a first half cycle of the signal on line 12b and the amplifier 46 is enabled during the other half cycle of the signal on the line 12b. Thus, the amplifiers 44 and 46 are operative during alternate half cycles of the signal generated by the generator 12. When operative, each of the amplifiers 44 and 46 produces at its output a signal which substantially matches the input signal on line 18a during that operative time period corresponding to the half cycle of the signal from generator 12. The outputs of the amplifiers 44 and 46 are summed and applied to the d.c. amplifier 48 to provide a signal whose d.c. level is proportional to the amplitude modulation on the signal of input line 18a. Thus, the demodulator acts as a switching means for removing the amplitude modulation from the signal applied from differential amplifier 18.

Figure 6A:
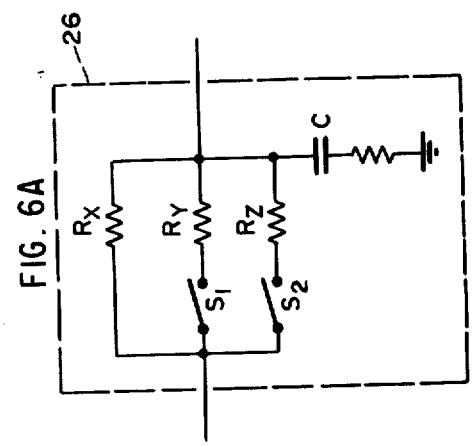

FIG. 6A illustrates an alternative to the low pass filter 26. The response of the system is determined by the damping of the signal in the filter 26. Various combinations of the resistors Rx, Ry, and Rz with the capacitor C may be had by opening or closing the switches S, and S2. The values of the resistors may be selected so that the fastest response is of the order of 2 khz or approximately 10 percent of a typical operating frequency of 20 khz. Slower response, when desired is obtainable by opening either or both of the switches S, and S2 to interpose greater resistance.

In practical terms, the values may be chosen so that with material passing through the lead at about 1000 yards per minute or about 16 yards per second, a response time of one second will detect faults or variations beyond set tolerances. With greater resistor settings and, therefore, longer time constants such short term variations would not be detected. Thus, the system is capable of detecting either short or long term changes as may be required in a particular application.

What is claimed is:

1. In a capacitive bridge measuring system for continuously monitoring the characteristics of a moving length of material, the combination of a sensor head incorporating said capacitive bridge, a source of two electrical signals of a given frequency, equal amplitude and opposite phase connected to opposite inputs of said bridge whereby said bridge is in balance, means for passing said length of material through said sensor head in proximity to two oppositely disposed individual capacitors of said bridge whereby said bridge is unbalanced and an unbalance output signal is produced, means for differentially amplifying said unbalance output signal, a demodulator having two inputs, means for applying one of said two electrical signals from said source to one of the inputs of said demodulator, means connecting said differential amplifying means to the other input of said demodulator whereby said unbalance output signal is demodulated to produce a second output signal proportional to unbalance of said bridge caused by said length of material passing through said sensor head.

2. In a capacitive bridge measuring system as defined in claim 1, the combination in which said sensor head comprises an outer shell, a plurality of conductive segments disposed in said shell and insulated from each other and from said shell, pairs of said segments forming said individual capacitors, said shell having at least an opening formed therein adjacent said two oppositely disposed individual capacitors to permit passage of said length of material therethrough in proximity to said two capacitors.

3. In a capacitive bridge measuring system as defined in claim 2, the combination in which one segment of each of said two capacitors has an opening formed therein, a transistor being disposed in each opening and in direct electrical connection therewith, each said transistor forming a part of an amplifier of said unbalance output signal.

4. In a capacitive bridge measuring system as defined in claim 2, the combination in which said sensor head has two parallel slotted openings formed therein defining three similar portions, each said portion including two of said conductive segments, the two conductive segments of the central portion having openings formed therein, a transistor being disposed in each said opening in said conductive segments of said central portion and having its input directly connected to its associated conductive segment, each of said transistor forming a part of an amplifier of said unbalance output signal.

5. In a capacitive bridge measuring system as defined in claim 4, the further combination therewith of a low pass filter connected to and receiving said second output signal, a reference comparator connected to and receiving the output of said low pass filter, said reference comparator including a low limit reference and a high limit reference, means for producing a first warning signal in response to said second output signal exceeding said high limit reference and means for producing a second warning signal in response to said second output signal falling below said low limit reference.

6. In a capacitive bridge measuring system as defined in claim 5, the combination in which said sensor head further includes a high denier indicator and a low denier indicator operable in response to said first warning signal and said second warning signal respectively.

7. A system for continuously monitoring the characteristics of a moving length of material compressing a sensor head, a capacitive bridge composed of first, second, third and fourth serially connected capacitors of equal value, a first input terminal at the junction of said first and fourth capacitors, a second input terminal at the junction of said second and third capacitors, a first output terminal at the junction of said first and second capacitors, a second output terminal at the junction of said third and fourth capacitors, a source of a first alternating signal of a given frequency, predetermined amplitude and a first phase connected to said first input terminal, a source of a second alternating signal of said given frequency, predetermined amplitude and a second phase opposite to said first phase connected to said second input terminal, means for passing said length of material through said head adjacent said first and third capacitors whereby the capacitance thereof is modified and output signals corresponding to said modified capacitance are produced at said output terminals, a differential amplifier connected to said output terminal for differentially amplifying said output signals, a demodulator connected to and synchronously responsive in operation to said source of a second alternating signal of said given frequency, means connecting the output of said differential amplifier to said demodulator, said demodulator producing a d. c. output corresponding to the instanteous value of said modified capacitance, and utilization means for continuously displaying the value of said modified capacitance in response to said d.c. output.

8. A system as defined in claim 7 and further comprising a low pass filter connected to said demodulator to receive the output thereof, said low pass filter including a resistance-capacitance network and switch means for changing the amount of resistance in said network.

9. The method of continuously monitoring the characteristics of a moving length of material utilizing a bridge composed of four joined capacitive elements which comprises the steps of applying a first signal to a first junction of said bridge, applying a second signal to a second junction opposite said first junction of said bridge, said first and second signals being substantially identical alternating signals but opposite in phase to one another, passing said material in proximity to two oppositely disposed capacitive elements of said bridge whereby said bridge is unbalanced and an output signal is produced at third and fourth junctions of said bridge, differentially amplifying said output signal, and synchronously demodulating said differentially amplified output signal to produce an output voltage varying with the characteristics of said moving length of material.

10. In a capacitive measuring system for monitoring the characteristics of material, the combination of four capacitive elements joined at four junction points to form a bridge, means for energizing said bridge at a first pair of opposite junction points, means for normally balancing said bridge to produce no signals at a second pair of opposite junction points, and means for bringing said material into proximity to two of said capacitive elements to affect the capacity thereof and produce an unbalance output signal representative of characteristics of said material at said second pair of opposite junction points.

11. In a system as defined in claim 10, the combination wherein said two capacitive elements are in oppositely disposed arms of said bridge, each said capacitive element having two plates and means are provided whereby said material is continuously passed between the two plates of each of said two capacitive elements.

12. In a system as defined in claim 11, the combination wherein one of said plates of each of said two capacitive elements has an opening formed therein, a transistor amplifier being disposed in each said opening, each said plate being in close electrical contact with the input to said transistor amplifier whereby said unbalance output signal may be amplified.

* * * * *